(12) United States Patent
Kamitani

(10) Patent No.: US 6,941,448 B2
(45) Date of Patent: Sep. 6, 2005

(54) DATA-DRIVEN PROCESSOR HAVING MULTIPLE-PRECISION DATA PROCESSING FUNCTION AND DATA PROCESSING METHOD THEREOF

(75) Inventor: Shingo Kamitani, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 786 days.

(21) Appl. No.: 09/879,004

(22) Filed: Jun. 13, 2001

(65) Prior Publication Data

US 2001/0056529 A1 Dec. 27, 2001

(30) Foreign Application Priority Data

Jun. 14, 2000 (JP) .......................... 2000-178733

(51) Int. Cl.$^7$ ................................................ G06F 9/06
(52) U.S. Cl. .......................... 712/25; 712/201
(58) Field of Search ........................ 712/25, 26, 27, 712/201; 708/505, 620

(56) References Cited

U.S. PATENT DOCUMENTS 5,359,720 A * 10/1994 Tamura et al. ............ 711/108
5,640,525 A *  6/1997 Yumoto et al. ............ 712/201
5,872,991 A *  2/1999 Okamoto et al. .......... 712/26

OTHER PUBLICATIONS

Smith, David M., "Algorithm 786: multiple-precision complex arithmetic and functions" Dec. 1998, ACM Transactions on Mathematical Software (TOMS), vol. 24 Issue 4.*

* cited by examiner

Primary Examiner—Henry W. H. Tsai
(74) Attorney, Agent, or Firm—Birch, Stewart, Kolasch & Birch, LLP

(57) ABSTRACT

When a prescribed operation is performed on 1024-bit multiple-precision data in a data-driven processor, the multiple-precision data is treated as a plurality of single-precision data obtained by dividing the multiple-precision data by every 32 bits in accordance with the memory word length of an accumulation memory, and a group of 32 memory words each having 32 bits of the accumulation memory is treated as the multiple-precision data. Accordingly, in the data-driven processor, a usual memory region can serve as an accumulator for multiple-precision data without having to provide any accumulator dedicated to multiple-precision data in the data-driven processor. In addition, since the multiple-precision data is divided into independent single-precision data each having 32 bits, operations for all data can be performed concurrently. Thus, a parallel processing capability of the data-driven processor can be maximized.

6 Claims, 9 Drawing Sheets

FIG. 4A
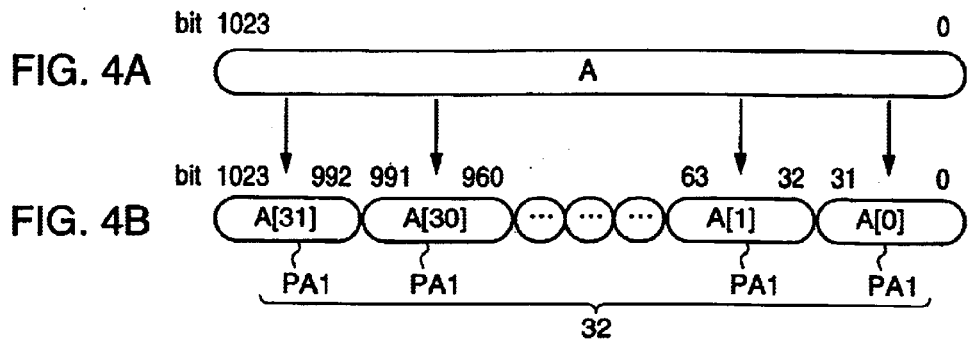
FIG. 4B
FIG. 5A
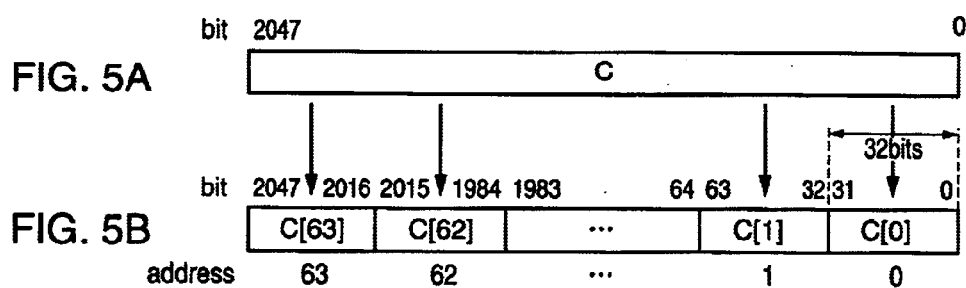
FIG. 5B
FIG. 6

FIG. 7

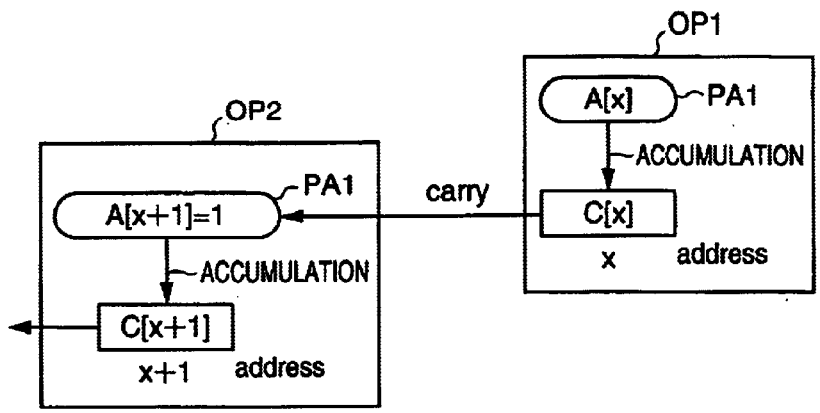

FIG. 8

$$
\begin{aligned}
C=A*B=(A[0]*B[0]) &\quad +(A[0]*B[1])<<(32*1) \\
+(A[0]*B[2])<<(32*2) &+(A[0]*B[3])<<(32*3) \\
+ \quad \cdots\cdots &\quad +(A[0]*B[31])<<(32*31) \\
+(A[1]*B[0])<<(32*1) &+(A[1]*B[1])<<(32*2) \\
+(A[1]*B[2])<<(32*3) &+(A[1]*B[3])<<(32*4) \\
+ \quad \cdots\cdots &\quad +(A[1]*B[31])<<(32*32) \\
+(A[2]*B[0])<<(32*2) &+(A[2]*B[1])<<(32*3) \\
+(A[2]*B[2])<<(32*4) &+(A[2]*B[3])<<(32*5) \\
+ \quad \cdots\cdots &\quad +(A[2]*B[31])<<(32*33) \\
&\cdots\cdots \\
&\cdots\cdots \\
+(A[31]*B[0])<<(32*31) &+(A[31]*B[1])<<(32*32) \\
+(A[31]*B[2])<<(32*33) &+(A[31]*B[3])<<(32*34) \\
+ \quad \cdots\cdots &\quad +(A[31]*B[31])<<(32*62)
\end{aligned}
$$
⎫ EXPRESSION (1)

DATA-DRIVEN PROCESSOR HAVING MULTIPLE-PRECISION DATA PROCESSING FUNCTION AND DATA PROCESSING METHOD THEREOF

BACKGROUND OF THE INVENTION

1. Field of the Invention

The present invention relates to data-driven processors and data processing methods thereof and, more particularly to a data-driven processor capable of performing a data-driven operation on data in a multiple-precision form (hereinafter referred to as multiple-precision data) and a data processing method thereof.

2. Description of the Background Art

For processing a large amount of data at high speed, a parallel processing is effective. Among architectures designed for parallel processing, what is called a data-driven architecture has particularly received a great deal of attention.

In a data-driven information processing system, a process goes in parallel according to a rule that "a process is performed when all input data required for a certain process is available and a resource such as an operating device required for that process is allocated."

FIG. 13 is a block diagram showing a data-driven information processing system employed in the prior art and an embodiment of the present invention. FIG. 14 is a diagram showing a conventional data-driven processor. FIGS. 15A and 15B are diagrams showing fields of data packets used in the prior art and the embodiment of the present invention.

FIG. 15A shows a basic structure of an input/output data packet PA of the data-driven processor. FIG. 15B shows a basic structure of a data packet PA1 transmitted within the data-driven processor.

Data packet PA shown in FIG. 15A includes a field 18 storing a processing element PE, a field 19 storing a node number N, a field 20 storing a generation number G and a field 21 storing data D. Data packet PA1 shown in FIG. 15B includes fields 19–21 as in FIG. 15A, and a field 22 storing an instruction code C.

Referring to FIG. 13, the data-driven information processing system includes a conventional data-driven processor 1 (a data-driven processor 10 of the embodiment of the present invention which will later be described), a data memory 3 preliminarily storing a plurality of data, and a memory interface 2. Data-driven processor 1 (10) includes input ports IA, IB and IV respectively connected to data transmission lines 4, 5 and 9 as well as output ports OA, OB and OV, respectively connected to data transmission lines 6, 7 and 8.

Data packet PA is input to data-driven processor 1 (10) in time series through input port IA or IB from data transmission line 4 or 5. A prescribed content to be processed is preliminarily stored in data-driven processor 1 (10) as a program, based on which a process is performed.

Memory interface 2 receives through data transmission line 8 an access request to data memory 3 (a request for referring/updating the content of data memory 3) output from output port OV of data-driven processor 1 (10). Memory interface 2 makes an access to data memory 3 through a memory access control line SSL in accordance with the received access request, and applies the access result to data-driven processor 1 (10) through data transmission line 9 and input port IV.

Data-driven processor 1 (10) performs a process on input data packet PA, and then outputs data packet PA through output port OA and data transmission line 6 or output port OB and data transmission line 7.

FIG. 14 shows the structure of a conventional data-driven processor 1. Referring to FIG. 14, data-driven processor 1 includes an input/output controlling portion 11, a joint portion 12, a firing controlling portion 13 used for a data-driven process, an operating portion 14 connected to a built-in memory 15, a program storing portion 16, and a branch portion 17.

Referring to FIGS. 15A and 15B, processing element PE is information used for identifying data-driven processor 1 where corresponding data packet PA should be processed in a system provided with a plurality of data-driven processors 1. Node number N is used as an address for making an access to the content of program storing portion 16. Generation number G is used as an identifier for uniquely identifying a data packet which is input in time series to data-driven processor 1. If data memory 3 is an image data memory, generation number G is also used as an address for making an access to data memory 3. In this case, generation number G indicates a field number F#, line number L# and pixel number P# successively from an upper bit.

In operation, when applied through data transmission line 4 or 5 to data-driven processor 1 designated by processing element PE, data packet PA of FIG. 15A turns to data packet PA1 of FIG. 15 at input/output controlling portion 11. Namely, input/output controlling portion 11 discards field 18 of processing element PE of input data packet PA, acquires instruction code C and new node number N based on node number N of input data packet PA for respectively storing them in fields 18 and 19 of input data packet PA, and then outputs data packet PA1 to joint portion 12. Thus, data packet PA1 applied from input/output controlling portion 11 to joint portion 12 has the structure shown in FIG. 15B. Note that generation number G and data D remain unchanged at input/output controlling portion 11.

Joint portion 12 successively inputs data packet PA1 from input/output controlling portion 11 and data packet PA1 output from branch portion 17 for outputting them to firing controlling portion 13.

Firing controlling portion 13 includes a waiting memory 731 for detecting a pair of data packets PA1 (this detection is referred to as firing), and a constant data memory 732 storing at least one constant data. Firing controlling portion 13 waits, if necessary, for data packet PA1 applied from joint portion 12 with use of waiting memory 731. As a result, data D in field 21 of one of two data packets PA1 having the same node number N and generation number G, i.e., a pair of two different data packets PA1, is additionally stored in field 21 of the other data packet PA1. The other data packet PA1 is output to operating portion 14. At the time, one data packet PA1 is deleted. Here, if the operation target is constant data, rather than data packet PA1, waiting is not performed at firing controlling portion 13. In this case, constant data is read out from constant data memory 732 and additionally stored in field 21 of data packet PA1, which is then output to operating portion 14.

Operating portion 14 receives data packet PA1 from firing controlling portion 13 and decodes instruction code C of received data packet PA1. Based on the decoding result, it performs a prescribed process. If instruction code C indicates an operation instruction with respect to the content of data packet PA1 including data D, a prescribed operation is performed on the content of data packet PA1 in accordance with instruction code C. The result is stored in data packet PA1, which is then output to program storing portion 16. Alternatively, if instruction code C of data packet PA1 indicates a memory access instruction, an access to built-in memory 15 is made, and data packet PA1 storing the access result is output to program storing portion 16. Note that the memory connected to operating portion 14 is not necessarily memory 15 which is contained in data-driven processor 1, but may be a memory externally connected to the processor.

If instruction code C indicates an access instruction with respect to data memory 3, operating portion 14 applies data packet PA1 to memory interface 2 through data transmission line 8 as an access request.

Memory interface 2 receives data packet PA1 applied through data transmission line 8 and makes an access to data memory 3 through memory access control line SSL in accordance with the content of received data packet PA1. The access result is stored in field 21 of input data packet PA1 as data D, and data packet PA1 is applied to operating portion 14 through data transmission line 9.

Program storing portion 16 has a program memory 161 in which a data flow program consisting of a plurality of subsequent instruction codes C and node numbers N. Program storing portion 16 receives data packet PA1 applied from operating portion 14 and reads out the subsequent node number N and subsequent instruction code C from program memory 161 by addressing based on node number N of received data packet PA1. Program storing portion 16 then stores read out node number N and instruction code C respectively in fields 19 and 22 of received data packet PA1, which is then output to branch portion 17.

Branch portion 17 determines if instruction code C of applied data packet PA1 is to be executed in operating portion 14 within data-driven processor 1 or in an operating portion 14 of external data-driven processor 1. If it is determined that instruction code C is to be executed in operating portion 14 of external data-driven processor 1, data packet PA1 is output to input/output controlling portion 11 which then outputs data packet PA1 to an external portion of the processor from an appropriate output port. On the other hand, if it is determined that instruction code C is to be executed in operating portion 14 within data-driven processor 1, data packet PA1 is applied to joint portion 12.

Thus, data packet PA1 circulates within data-driven processor 1, whereby a process goes in accordance with a data flow program preliminarily stored in program memory 161.

The data packet is asynchronously transmitted by handshake in data-driven processor 1. The process in accordance with the data flow program stored in program memory 161 proceeds in parallel in accordance with a pipeline process where the data packet circulates in data-driven processor 1. Thus, in the data-driven processing method, parallelism of data packet process is high and a flow rate of the data packet circulating in the processor governs in part a processing performance.

In recent years, the feature of such a data-driven processing method is applied in the fields of image processing or video signal processing which requires an intensive high-speed operation. Because of their nature, image data or video signal data have a small bit length. Accordingly, the data of a small bit length is processed in image processing or video signal processing. Presently, field 21 of data D shown in FIGS. 15A and 15B has a 12-bit length. Similarly, 1 word in data memory 3 or built-in memory 15 has a 12-bit length.

Unlike the above described image processing or video signal processing, some processes involve processing of data having an extremely large bit length. Examples of such a process include a public key encryption using a public key or corresponding decryption.

Here, the above mentioned public key encryption will be described. If a certain text (data) is to be transmitted to a specific party while ensuring security to the other parties, the text (data) to be transmitted is called a plaintext and an encrypted text to be transmitted is called a cipher text. A parameter for converting (encrypting) the plaintext to the cipher text according to a certain rule or for converting (decrypting) that cipher text back to the plaintext is called a key. In a public key cryptosystem, because of its mathematical nature, a cipher text cannot be decrypted or readily decrypted, if possible, unless secret keys of a transmitter and receiver are known even if the cipher text or public key is known to the third party. An RSA (Rivest, Shamir, Adleman) or DH (Diffie Hellman) is representative of such a public key cryptosystem. In the following, key exchange in accordance with DH will be described by way of example.

Assume that two persons, A and B, perform key exchange. A and B respectively generate their own secret keys S (A) and S (B) based on which their own public keys P (A) and P (B) are generated in the following manner. Note that secret keys S (A) and S (B) are both 1024 bits in length. In the public key encryption, a secret key generally has a 1024-bit length.

Public key P (A)=G^S (A) modP and public key P (B)=G^S (B) modP are found. Here, "^" and "mod" respectively represent power operation and residual operation. Variables G and P are preliminary determined as constants. A and B exchange their own public keys. Upon receipt of the public key of the counterpart, a common key C is generated as follows. Specifically, A generates common key C in accordance with C=P (B)^S (A) modP, and B generates common key C in accordance with C=P (B)^S (A) modP.

Common keys C generated by A and B have the same value. In this manner, the key can be shared by the transmitter and receiver while preventing the secret keys from being known to the third party. Note that S (A), S (B) and P are data of a 1024-bit length. Similarly, P (A), P (B) and C are also data of a 1024-bit length.

To obtain the operation result of "X^YmodZ" used for generating the above described public key, multiplication or square operation with constant X and division with a divisor Z are alternately repeated. To store intermediate results of the repetitive operations, operation regions U (2048 bits) and V (2048 bits) are prepared. A process for the operation of "X^YmodZ" is shown in FIG. 16.

FIG. 16 is a flow chart showing a process for the operation of X^YmodZ in a von Neumann machine. The process flow shown in FIG. 16 will be described. Variables X, Y and Z have a 1024-bit length. These variables are start in an internal memory of the machine and read out therefrom at the start of the process. Thereafter, the intermediate operation and storage of the result are alternately repeated. Note that in the process flow, variable Y[k] represents a value of the k-th bit of variable Y.

First of all, initial setting is made in step S1. Namely, the content of operation region U is reset and 1 is set in operation region V. Then, 1023 is set to control variable k. More specifically, while decrementing control variable k starting from 1023 down to 0 by 1, the following operations are repeated.

In step S2, the process branches depending on whether variable Y[k] is 1 or 0. If variable Y[k] is 1, the process goes to step S3. If 0, the process goes to step S6 which will later be described.

In step S3, an operation of (V×X) is performed and the result is stored in operation region U. In the following step S4, an operation in accordance with U%Z is performed, i.e., a residue of (the value stored in operation region U÷Z) is found and stored in operation region V. In the following step S5, a determination is made as to if control variable k is 0. If not 0, in step S6, the value of operation region V is raised to the second power and the result is stored in operation region U. In the next step 7, an operation in accordance with U%Z is performed, i.e., a residue of (the value stored in operation region U÷Z) is found and stored in operation region V. In the next step S8, the value of control variable k is decremented by 1. The following steps S2-S8 are repeated until it is determined that k=0 in step S5. As a result, the value stored in operation region V is determined the operation result of "X^YmodZ".

As described above, the need exists for processing multiple-precision data as represented by the public key encryption and decryption. However, no method of processing multiple-precision data by the conventional data-driven processor 1 has been established. In detail, the public key encryption requires a bit length of about 1024 bits. However, it is extremely difficult to form in data-driven processor 1 a calculator, data packet and memory words with such a bit length because of physical restrictions of a circuit mounting area and bus width when data-driven processor 1 is implemented by an LSI (abbreviation for Large Scale Integration).

SUMMARY OF THE INVENTION

An object of the present invention is to provide a data-driven processor capable of efficiently processing multiple-precision data and a data processing method in the data-driven processor.

To achieve the above mentioned object, the data-driven processor in one aspect of the present invention includes a memory of n (where n is any integer of at least 2) regions each having a k-bit length (where k is any positive integer), and an operating portion for performing an operation on data stored in the n regions hereinafter referred to as memory data).

The operating portion includes a prescribed operation performing portion, a data accumulating portion, and overflowing data accumulating portion.

The prescribed operation performing portion performs a prescribed operation on the memory data and the k-bit data stored in the data field of the applied data packet in accordance with a prescribed operation instruction and divides the result of the prescribed operation into a plurality of k-bit data for outputting a plurality of data packets respectively storing in data fields the plurality of k-bit data obtained by the division.

Each of the plurality of data packets output from the prescribed operation performing portion is processed by the data accumulating portion and the overflowing data accumulating portion. Specifically, the data accumulating portion inputs the data packet and accumulates the k-bit data in the data field of that data packet on the memory data in the corresponding region at a prescribed address of the memory, storing the accumulation result of the data excluding the overflowing data in that region, and outputs the data packet storing the overflowing data in the data field.

The overflowing data accumulating portion inputs the data packet storing the overflowing data in the data field, accumulates the overflowing data in the data field of that data packet on the memory data in the corresponding region at a prescribed upper address different from a prescribed address in the memory, stores the accumulation result of data excluding the overflowing data in that region, and outputs the data packet storing the overflowing data in the data field. As long as accumulation causes overflow of data in the region at a prescribed address, accumulation is repeated for the overflowing data by the overflowing data accumulating portion.

With the above described data-driven processor, when a prescribed operation is performed on the multiple-precision data, the multiple-precision data is treated as a plurality of single-precision data each having a k-bit length, and a group of n regions of k-bit length in the memory is treated as the multiple-precision data. Therefore, a usual memory region serves as an accumulator of multiple-precision data without having to provide any special accumulator dedicated to multiple-precision data in the data-driven processor, so that the data-driven processor can be reduced in size when a prescribed operation is to be performed on the multiple-precision data.

In the prescribed operation of multiple-precision data, operations for all data are performed concurrently since multiple-precision data is divided into single-precision k-bit data, so that a parallel processing capability of the data-driven processor can be maximized.

In addition, the data-driven processor has a capability of pipeline parallel processing in addition to that of concurrently performing a plurality of operations. Thus, in the prescribed operation of multiple-precision data, if overflow successively occurs during accumulation of data by the memory, a delay amount of the process due to the successively occurring overflow is restrained by another process of single-precision data. Namely, the occurrence of overflow hardly affects a required time (response) for the overall multiple-precision data operation.

Further, there is no logical restriction on the data length of multiple-precision data. Namely, since a usual memory region or data packet of the data-driven processor is used, a prescribed operation can be performed on the multiple-precision data of any bit length as long as physical resources permit. In addition, various multiple-precision data with different bit lengths can be concurrently processed.

The above described prescribed operation may be any of addition, subtraction, division and multiplication.

In the above described data-driven processor, the operating portion further includes overflow determinating portion determinating if there is overflowing data in the region at a prescribed address as a result of accumulation. In response to the determination by the overflow determinating portion that there is overflowing data, the overflowing data accumulating portion accumulates the overflowing data.

With the above described data-driven processor, the overflow determinating portion provides for accumulation of the overflowing data by the overflowing data accumulating portion when there is overflowing data. Therefore, a prescribed operation can be performed while reliably carrying forward the overflowing data.

In the above described data-driven processor, if two multiple-precision data of m-bit length (where m is any integer satisfying n*k≧m), the following feature is provided. More specifically, data obtained by dividing one multiple-precision data by every k-bit length are stored as memory data respectively in n regions of the memory. The data obtained by dividing the other multiple-precision data by every k-bit length are stored in the data fields of n data packets, which are sequentially applied to the prescribed operation performing portion.

With the above described data-driven processor, a prescribed operation can be performed on two multiple-precision data of m-bit length.

In the above described data-driven processor, the data packet further includes a generation field in which a generation number for uniquely identifying the data packet is stored, and the prescribed address is designated based on the content of the generation field of the data packet.

With the above described data-driven processor, the prescribed address of the memory region serving as an accumulator is designated based on the content of the generation field in which the generation number for uniquely identifying the data packet is stored. Thus, the prescribed address corresponding to each of the plurality of single-precision k-bit data obtained by dividing the multiple-precision data is uniquely designated, whereby accumulation can be reliably performed in the memory.

In the above described data-driven processor, each of the data accumulating portion and overflowing data accumulating portion operates as follows. Namely, it operates in accordance with an instruction for receiving the applied data packet, accumulating the content of the data field in that received data packet on the memory data in the region at the prescribed address of the memory, storing the accumulation result of data excluding the overflowing data in that region, storing the overflowing data in the data field of the input data packet, and outputting the received data packet.

With the above described data-driven processor, in each of the data accumulating portion and overflowing data accumulating portion, the same type of operation instruction is executed. Accordingly, if multiple-precision data is subjected to a prescribed operation, the type of the operation instructions required for execution can be minimized, facilitating maintenance and debug of the program.

The data processing method of the data-driven processor in another aspect of the present invention refers to a method of the data-driven processor provided with a memory including n (where n is any integer of at least 2) regions each having a k-bit length (where k is any positive integer) and storing memory data in these n regions. The method includes a prescribed operation performing step, a data accumulating step, and overflowing data accumulating step.

In the prescribed operation performing step, the memory data and k-bit data stored in the data field of the applied data packet are subjected to a prescribed operation process in accordance with a prescribed operation performing instruction. The result of the prescribed operation is divided into a plurality of k-bit data, and a plurality of data packets storing in data fields the plurality of k-bit data obtained by the division are output.

In the data accumulating step and overflowing data accumulating step, a plurality of data packets output by the prescribed operation performing step are input, each of which is then subjected to a process. Specifically, in the data accumulating step, the k-bit data in the data field of the data packet is accumulated on the memory data in the region at a prescribed address of the memory and the accumulation result of data excluding the overflowing data is stored in that region, and a data packet storing in the data field the overflowing data is output.

In the overflowing data accumulating step, when the data packet storing the overflowing data in the data field is input, the overflowing data in the data field of that data packet is accumulated on the memory data in the region at an upper prescribed address different from that in the memory, the accumulation result of data excluding the overflowing data is stored in that region, and the data packet storing in the data field the overflowing data is output. As long as there is overflowing data in the region at a prescribed address as a result of the above described accumulation, accumulation of the overflowing data by the overflowing data accumulating step is repeated.

With the above described data processing method, when a prescribed operation is performed on multiple-precision data, the multiple-precision data is treated as a plurality of single-precision data each having a k-bit length, and a group of n regions of k-bit length in the memory is treated as the multiple-precision data. Thus, a usual memory region serves as an accumulator for multiple-precision data without any accumulator dedicated to multiple-precision data in the data-driven processor. Accordingly, even when a prescribed operation is to be performed on multiple-precision data, the data-driven processor can be reduced in size.

In the prescribed operation of multiple-precision data, all data can be concurrently processed since the multiple-precision data is divided into independent single-precision data each having a k-bit length. Thus, the parallel processing capability of the data-driven processor can be maximized.

In addition, the data processing method of the data-driven processor has a capability of pipeline parallel processing in addition to a capability of concurrently performing a plurality of operations. Thus, in the prescribed operating process of multiple-precision data, if overflow successively occurs during accumulation of data in that memory, a delay amount of the process caused by successively occurring overflow can be restrained by another process of single-precision data. Namely, the occurrence of overflow hardly affects a required time (response) for the overall process of multiple-precision data.

Further, there is no logical restriction as to the data length of the multiple-precision data. In other words, since a usual memory region or data packet of the data-driven processor is used, multiple-precision data of any bit length can be subjected to a prescribed operation as long as physical resources permit. In addition, various types of multiple-precision data with different bit lengths can be concurrently processed.

The above-described prescribed operation process may be any of addition, subtraction, division and multiplication.

In the above described data processing method, the operating step further includes overflow determining step of determining if there is overflowing data in the region at a prescribed address as a result of accumulation. In response to the determination that there is overflowing data by the overflowing data determining step, the overflowing data is accumulated by the overflowing data accumulating step.

In the above described data processing method, the overflowing determining step provides for accumulation of the overflowing data by the overflowing data accumulating step if there is overflowing data. Accordingly, the overflowing data can be reliably carried forward for a prescribed operation.

In the above described data-driven processing method, if two multiple-precision data of m-bit length (where m is any integer satisfying $n*k \geq m$) are subjected to a prescribed operation, the method is performed in the following manner. Namely, data obtained by dividing one multiple-precision data by every k-bit length are stored as memory data respectively in n regions of the memory, and data obtained by dividing the other multiple-precision data by every k-bit length are stored in data fields of n data packets, which are sequentially applied for the prescribed operation performing step.

In the above described data-driven processing method, two multiple-precision data of m-bit length (where m is any integer satisfying n*k≧m) can be subjected to the prescribed operation.

In the above described data-driven processing method, the data packet further includes a generation field in which a generation number for uniquely identifying the data packet is stored, and the prescribed address is designated based on the content of the generation field of the data packet.

In the above described data-driven processing method, the prescribed address of the memory region serving as an accumulator is designated based on the content of the generation field in which the generation number for uniquely identifying the data packet is stored. Thus, the prescribed addresses respectively corresponding to a plurality of single-precision k-bit data obtained by dividing the multiple-precision data are uniquely designated, whereby accumulation can be reliably performed in the memory.

In the above described data-driven processing method, the data accumulating step and overflowing data accumulating step is performed in accordance with an operation instruction for inputting the applied data packet, accumulating the content of the data field in the input data packet on the memory data in the region at the prescribed address of the memory, storing the accumulation result of data excluding the overflowing data in that region, storing the overflowing data in the data field of the input data packet, and outputting the input data packet.

In the above described data-driven processing method, in each of the data accumulating step and overflowing data accumulating step, the same type of operation instruction is executed. Thus, even when multiple-precision data is subjected to a prescribed operation, the number of types of operation instructions required for execution is minimized, facilitating maintenance and debug of the program.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4A and 4B are diagrams shown in conjunction with division of multiple-precision data according to the present embodiment.

FIGS. 5A and 5B are diagrams shown in conjunction with exemplary storage of multiple-precision data in a region of an accumulation memory 151.

FIG. 6 is a diagram illustrating overflow in a memory word.

FIG. 7 is a diagram shown in conjunction with a memory accumulation instruction ACCMC according to the present embodiment.

FIG. 8 is a diagram showing a multiplication expression of A*B according to the present embodiment.

DESCRIPTION OF THE PREFERRED EMBODIMENTS

Now, an embodiment of the present invention will be described.

First, the feature of the present embodiment will be described in the following.

In the present embodiment, data or memory word of a small bit length falling within a range that is practical for LSI implementation is used for the operation process of multiple-precision data in a data-driven processor. It is noted that the memory word herein refers to memory data that can be accessed by executing one memory access instruction in the data-driven processor.

Figure 1:
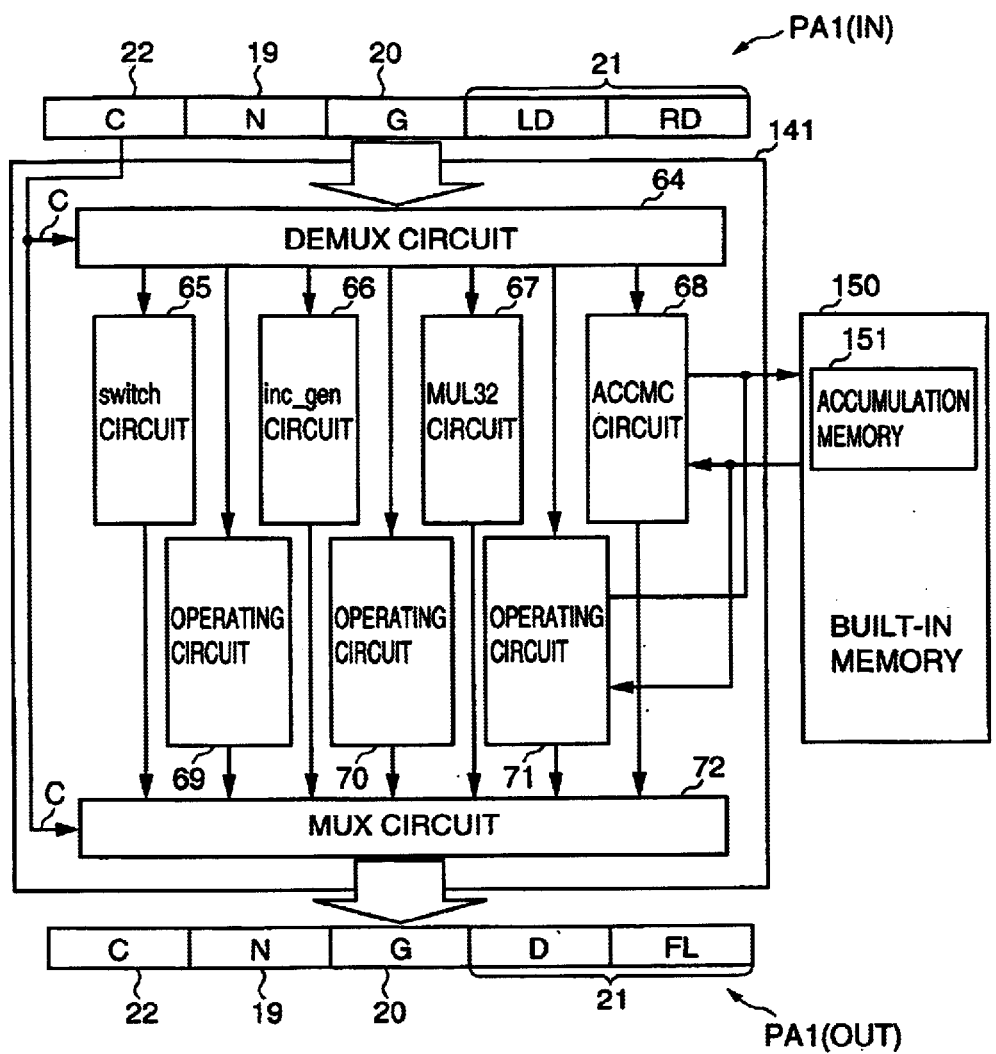
FIG. 1 is a diagram showing a structure of an operating portion 141 according to an embodiment of the present invention along with an input/output data packet.
Figure 2:
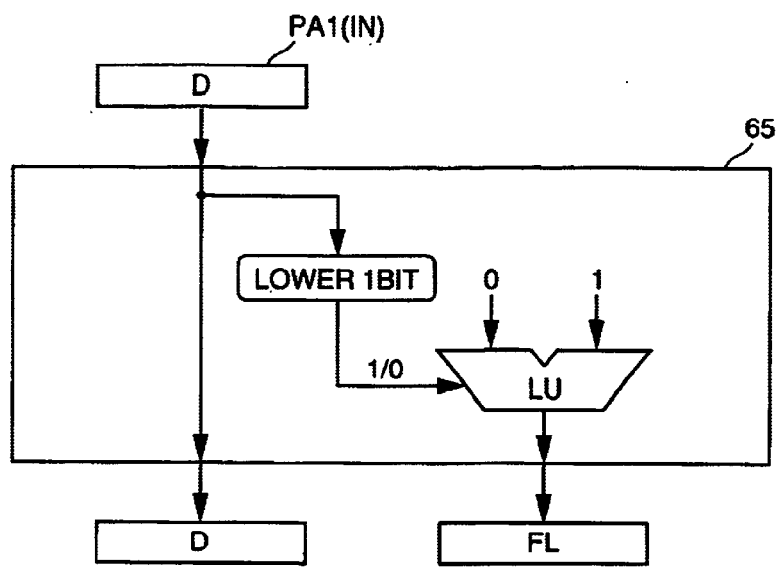
FIG. 2 is a diagram showing a structure of a switch circuit 65 of FIG. 1 along with the input/output data.
Figure 3:
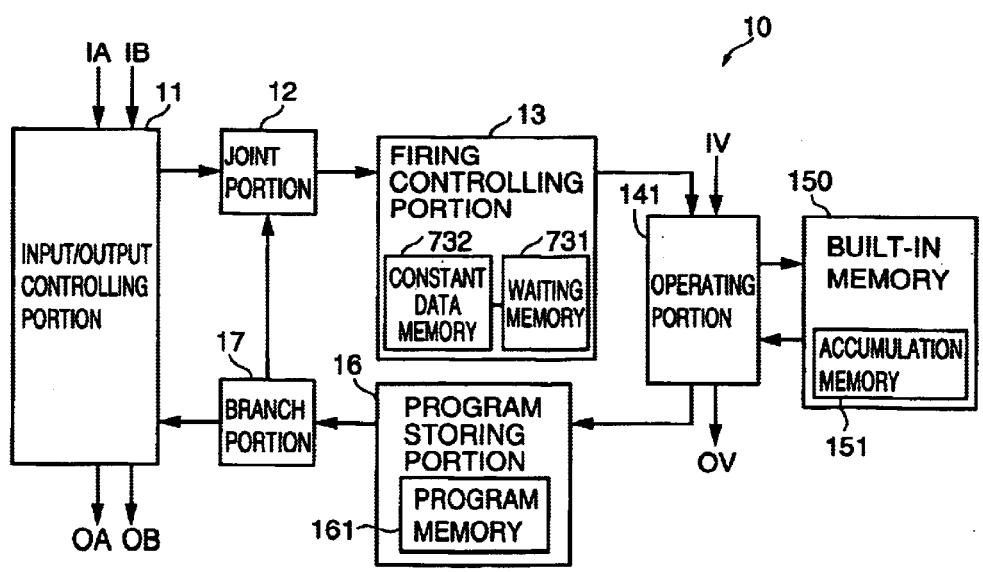
FIG. 3 is a block diagram showing a data-driven processor 10 according to the embodiment of the present invention.

FIG. 1 is a diagram showing the structure of an operating portion 141 according to the embodiment of the present invention along with a data packet to be input/output. FIG. 2 is a diagram showing the structure of a switch circuit 65 of FIG. 1 along with data to be input/output. FIG. 3 is a block diagram showing a data-driven processor 10 according to the embodiment of the present invention. FIGS. 4A and 4B are diagrams shown in conjunction with division of multiple-precision data according to the present embodiment.

Figure 13:
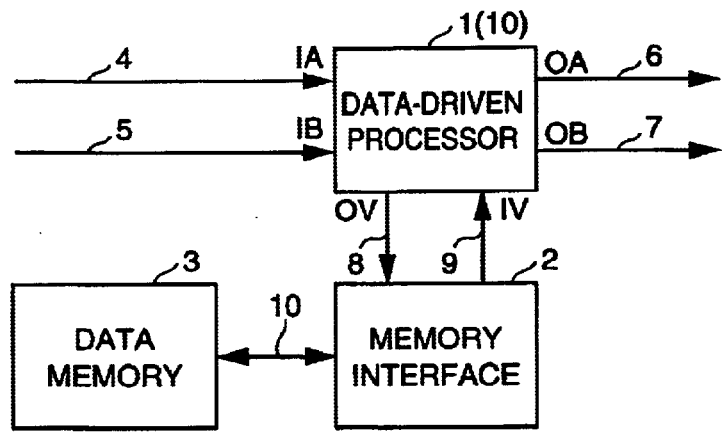
FIG. 13 is a block diagram showing a data-driven information processing system employed in the prior art example and the embodiment of the present invention.
Figure 14:
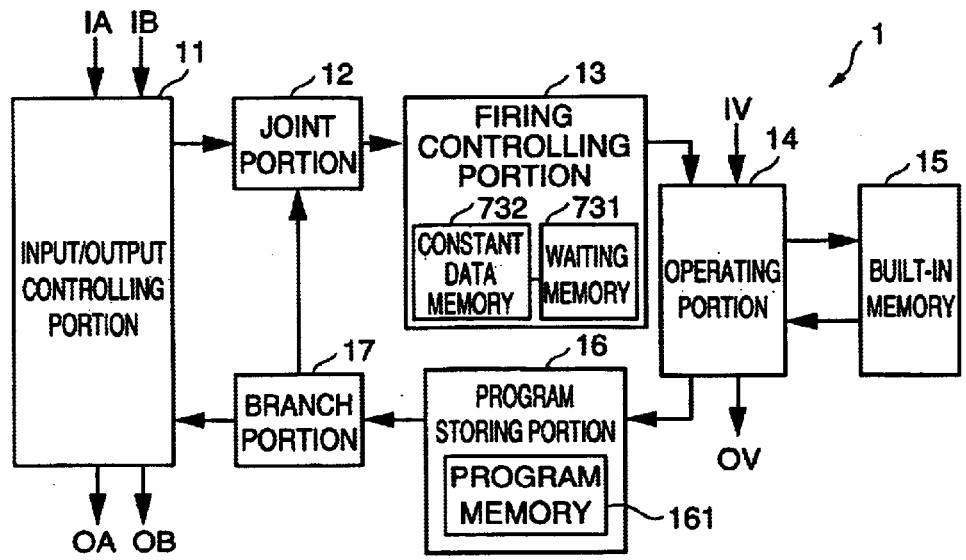
FIG. 14 is a diagram showing a conventional data-driven processor.

Data-driven processor 10 of FIG. 3 is provided in place of a conventional data-driven processor 1 in the system shown in FIG. 13. Data-driven processor 10 of FIG. 3 differs from conventional data-driven processor 1 of FIG. 14 in that it has an operating portion 141 and a built-in memory 150 provided with an accumulation memory 151 in place of operating portion 14 and built-in memory 15 of data-driven processor 1. The other parts of data-driven processor 10 are the same as those of data-driven processor 1 and therefore description thereof will not be given.

Referring to FIG. 1, operating portion 141 includes an ACCMC circuit 68 executing a memory accumulation instruction ACCMC in addition to the structure of conventional operating portion 14. Operating portion 141 includes a DEMUX circuit 64, switch circuit 65 executing a switching instruction "switch," an inc_gen circuit 66 executing an instruction "inc_gen," an MUL32 circuit 67 executing a multiplication instruction MUL32, an ACCMC circuit 68, operating circuits 69–71 performing other types of operations, and an MUX (abbreviation for multiplexer) circuit 72.

Switch circuit 65, inc_gen circuit 66 and MUL32 circuit 67 are conventionally known. Instructions "switch" and "inc_gen" will be described later.

A data packet PA1 (IN) is input to operating portion 141. Data packet PA1 (IN) stores an instruction code C, node number N, generation number G, and left data LD and right data RD as data D of field 21. Left data LD and right data RD are two operand data obtained as a result of waiting at firing controlling portion 13 when instruction code C is for example a two-term operation instruction. Note that even if instruction code C is an instruction for two-term operation, when one of two operand data to be subjected to operation is a constant, a constant data read from constant data memory 732 is stored in firing controlling portion 13.

When data packet PA1 (IN) is input to operating portion 141, instruction code C of input data packet PA1 is applied to DEMUX circuit 64 and MUX circuit 72. DEMUX circuit 64 selects one of operating circuits 65–71 in accordance with applied instruction code C, and applies that input data packet PA1 (IN) to the selected circuit. Operating circuit 71 and ACCMC circuit 68 make an access to built-in memory 150 as necessary. Each operating circuit inputs applied data packet PA1 (IN) and performs an operation thereon in accordance with corresponding instruction code C. Then, the operating circuit stores the operation result in field 21 of data packet PA (IN) and applies data packet PA1 (IN) to MUX circuit 72.

MUX circuit 72 selects and inputs one of outputs from operating circuits 65–71 in accordance with applied instruction code C. Then, the input data packet is output as data packet PA1 (OUT) and applied to a program storing portion 16.

Data packet PA1 (OUT) stores instruction code C, node number N, generation number G, and data D and a true/false flag FL in field 21.

True-false flag FL is 1-bit flag data that is output depending on the result of the switching instruction including instruction "switch." If the determination result of instruction "switch" is "true" and "false," 1 and 0 are respectively set to flag FL. For an instruction other than the switching instruction, 1 representing "true" is always output as flag FL. Subsequent instruction code C and node number N are read out from program memory 161 of program storing portion 16 in accordance with flag FL. Namely, depending on the value of flag FL, for example, one of instructions "end_ judge" and "inc_gen" is selectively read out from program memory 161 as an instruction which is executed following instruction "switch."

FIG. 2 shows an exemplary structure of switch circuit 65 of FIG. 1. Switch circuit 65 includes a logic circuit LU. Switch circuit 65 has a switching function performed with reference to bit data in field 21 of data packet PA1 (IN) and a function of determining if the output value of memory accumulation instruction ACCMC is 0. In switch circuit 65, the value of lower 1-bit (1 or 0) data D in field 21 of data packet PA1 (IN) is applied to logic circuit LU. Logic circuit LU outputs flag FL indicating 1 and 0 if the applied 1-bit data is respectively 0 and 1. Accordingly, if flag FL indicates 1, it means that the output value as a result of the execution of memory accumulation instruction ACCMC is 0. The data in field 21 of input data packet PA1 (IN) is stored as data D in field 21 of output data packet PA1 (OUT).

In the present embodiment, multiple-precision data to be subjected to the operation process is divided into a plurality of data having a bit length that can be stored in field 21 of the data packet transmitted within data-driven processor 10. Assume that multiple-precision data of 1024 bits is divided into 32 data each having 32 bits. The division is illustrated in FIGS. 4A and 4B. Multiple-precision data A of 1024 bits shown in FIG. 4A is divided into data A[0]~A[31] of 32 bits shown in FIG. 4B. Each of data A[0]~A[31] is stored in field 21 of respective data packet PA1, and information corresponding to a value of j indicating the position of a bit of multiple-precision data A to which data A[j] (where j=0, 1, 2, . . . , 31) corresponds is stored as a part of field 20. Note that a specific method of storing in field 20 is determined by the actual operation.

Thus, multiple-precision data A of 1024 bits is represented as a group of 32 data packets PA1. For each of 32 data packets PA1 shown in FIG. 4B, only data A[0]~A[31] stored in field 21 are shown and data in other fields are not shown.

FIGS. 5A and 5B are diagrams shown in conjunction with an exemplary method of storing multiple-precision data in the region of accumulation memory 151. The region of accumulation memory 151 in built-in memory 150 is accessed as a memory for storing an intermediate result or final result of the operation on multiple-precision data. The region of accumulation memory 151 is divided into memory words each having a bit length that allows operation of multiple-precision data. In the case of operation on multiple-precision data of 2048 bits, for example, the multiple-precision data is divided into 64 data each having 32 bits and stored in the region of accumulation memory 151. This is illustrated in FIGS. 5A and 5B.

Multiple-precision data C of 2048 bits shown in FIG. 5A is divided into data C[0]–C[63] each having 32 bits as shown in FIG. 5B, which are then stored as memory words at addresses 0–63 in accumulation memory 151. Information corresponding to a value of h that indicates a correspondence of data C[h] (h=0, 1, 2, . . . , 63) to each of multiple-precision data C corresponds to addresses 0–63. The address is herein applied as a relative value with reference to a certain offset (address 0). Thus, in accumulation memory 151, multiple-precision data C of 2048 bits is represented as a row of 64 memory words.

Although it is desired that the row of 64 memory words functions as an accumulator having a memory region of 2048 bits, the memory word rows is merely a group of 64 totally independent memory words each having 32 bits. However, accumulation is performed in that memory on 32-bit data D of in field 21 of data packet PA1 and one memory word having a 32-bit length in the memory. Thus, to make the above described 64 memory words function as an accumulator for the multiple-precision data, the content of the memory word at the next address must be updated with information on overflow, specifically, overflow or underflow caused during accumulation of 32-bit data.

Stated differently, if the result of "data D (32 bits)+data (32 bits) of a prescribed memory word" overflows, exceeding a value that can be represented with 32 bits, only the lower 32 bits of the result value are stored as the prescribed memory word, and the overflowing 1 must be added to the content of the memory word at the next address of the prescribed memory word. Conversely, if the result value of "data D (32 bits)–data (32 bits) of a prescribed memory word" is a negative value causing underflow, only the lower 32 bits of the result value are stored as the prescribed memory word, and the underflowing 1 must be subtracted from the content of the memory word at the next address of the prescribed memory word. For this purpose, operating portion 141 of data-driven processor 10 has, in addition to the conventional function, a function of executing an instruction regarding a memory access for processing such overflow or underflow as can be seen in FIG. 1.

FIG. 6 is a diagram shown in conjunction with overflow caused to the memory word. FIG. 6 shows only field 21 of data packet PA1, and illustration of other fields is not given. FIG. 6 assumes that data D of data packet PA1 is accumulated on the content of the memory word at a designated address, resulting in overflow.

Referring to FIG. 6, assume that a process is performed with an instruction of "data A[x] in field 21 of data packet PA1 is accumulated on memory word C[x] and memory words C[63]–C[0] are updated with the accumulation result," not using memory accumulation instruction ACCMC. Then, the process flows as in the following steps (A1)–(A5) and (B1)–(B5).

Step (A1): an address in accumulation memory 151 is obtained from generation number G of data packet PA1. For example, assume that an address x is obtained by operation.

Step (A2): a value of memory word C[x] is read out from accumulation memory 151.

Step (A3): the result of the above step (A2) is added to data A[x], and addition result D is obtained (D→C[x]+A[x]).

Step (A4): the data of the lower 32 bits of the addition result from the above step (A3) is written to address x in accumulation memory 151.

Step (A5): a determination is made as to if the addition result of the above step (A3) exceeds a value that can be represented with 32 bits (if overflow is caused). If no overflow is caused, the process ends. If the overflow is caused, the process goes to the next step.

Step (B1): the next memory address x+1 is calculated.

Step (B2): memory word C[x+1] is read out from accumulation memory 151.

Step (B3): 1 is added to the value read out in step (B2) and the addition result D is obtained (D→C[x+1]+1).

Step (B4): the data of the lower 32 bits of the addition result from step (B3) is written to address x+1 in accumulation memory 151.

Step (B5): a determination is made as to if the addition result from step (B3) exceeds a value that can be represented with 32 bits (if overflow is caused). If no overflow is caused, the process ends. If overflow is caused, 1 is added to x+1 to provide (x+2) and the process of steps (B1–B5) is repeated. The overflow is caused as long as there is a relation of C[x+1]=0xffff.

Taking into account the possibility of such an indefinite number of successive overflows, it is difficult to mount a hardware for processing an instruction for a certain number of memory accesses by one execution onto a conventional operating portion 14 for the following reasons. More specifically, the above described process is repeated until the addition result becomes free from overflow, and the repetition time is dependent on the occurrence of successive overflows. Thus, the time required for execution of the instruction varies every time. In addition, the data-driven processor has a pipeline structure, and when data packet PA1 flows within the pipeline, the overall process of data packet PA1 proceeds without delay and data packet PA1 cannot be carried forward unless the pipeline in the preceding stage becomes empty. Thus, if the instruction requires a considerable execution time, there would be a possibility of congestion among pipelines. To avoid such congestion, a special measure must be taken, for example, by branching the path of pipelines or by adding buffers. In the pipeline of the operating portion, if the path of data packet PA1 is branched in accordance with the above described accumulation instruction and other instructions, since the path of the pipeline, i.e., a part of built-in memory 15, is designed for use as an accumulator, memory access in accordance with the other instruction is prohibited during execution of the indefinite times of memory accesses for built-in memory 15 as described above. As a result, the processing speed decreases.

The present embodiment is adapted as follows to avoid disadvantages of congestion and decrease in processing speed. Specifically, an instruction referred to as a memory accumulation instruction ACCMC is proposed. According to the instruction, if overflow is caused, overflowing value (1) is not accumulated on the upper memory word in accumulation memory 151, but stored as data D in field 21 of data packet PA1 which is then output.

FIG. 7 is a diagram shown in conjunction with memory accumulation instruction ACCMC of the present embodiment. FIG. 7 shows only the value of data D stored in field 21 of data packet PA1, and contents of the other fields are not shown. In FIG. 7, processes OP1 and OP2 are performed. First of all, in process OP1, when data packet PA1 storing "ACCMC" as instruction code C, A[x] as data D, and x as generation number G is applied to operating portion 141, memory word C[x] at address x in accumulation memory 151 is read out in accordance with memory accumulation instruction ACCMC, data A[x] of data packet PA1 is accumulated on that value, and the result free from overflow is written as memory word C[x]. Using a value (+1) of overflow caused as a result of accumulation, the content of field 21 in data packet PA1 is updated with A[x+1], and the data packet is output from operating portion 141.

After circulating in the pipeline of the processor at least once, data packet PA1 is applied to operating portion 141. In process OP2, similarly, memory word C[x+1] at the next address x+1 in accumulation memory 151 is read out in accordance with memory accumulation instruction ACCMC of the data packet, the read out content and data A[x+1] (A[x+1]=1) of the data packet are accumulated, and the accumulation result is written as memory word C[x+1] at address x+1 in accumulation memory 151. Thus, accumulation as well as a process of the overflow caused as a result of the accumulation can be performed.

As described above, even if overflow successively occurs, one reading and one writing need only be performed with respect to accumulation memory 151 for executing one accumulation instruction. In addition, if a plurality of accumulation instructions are successively performed as a result of the above mentioned successively occurring overflow, the parallel processing of the pipeline in the data-driven processor restrains the delay time associated with the operation.

Next, a specific operation of the above described present embodiment will be described.

Here, an operation process will be exemplified that involves multiplication of multiple-precision data A of 1024 bits by multiple-precision data B of 1024 bits to provide multiple-precision data C of 2048 bits, by way of example.

Figure 15A:
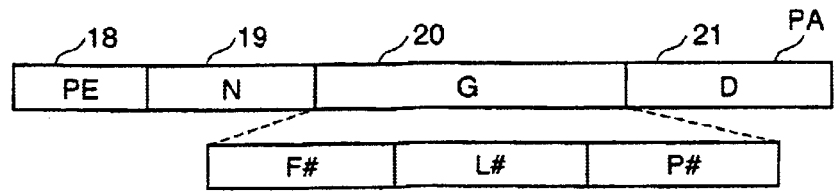
FIGS. 15A and 15B are diagrams showing fields of a data packet of the prior art and the embodiment of the present invention.
Figure 15B:
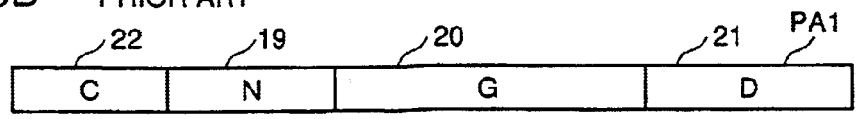
Figure 16:
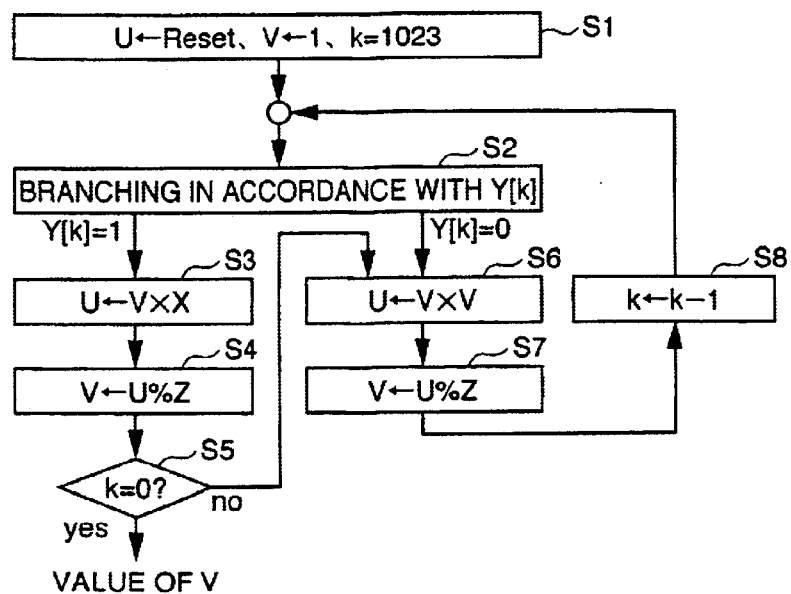
FIG. 16 is a flow chart showing operation of X^YmodZ in a von Neumann machine.

Assume that data packet PA1 of FIG. 15B circulating in the pipeline of data-driven processor 10 of FIG. 3 has field 21 of 32 bits and 1 memory word has 32 bits in accumulation memory 151.

In the initial state, multiple-precision data A and B are stored in accumulation memory 151. In accumulation memory 151, multiple-precision data A is stored in 32 memory words A[0]–A[31], and multiple-precision data B is stored in 32 words of memory words B[0]–B[31]). When multiplication is performed, memory word A[i] and memory word B[j] (i, j=0, 1, 2, 3 . . . , 31) are read out as necessary from accumulation memory 151 for operation. Then, multiple-precision data C of the multiplication result having 2048 bits includes 64 memory words C[0]–C[63] in accumulation memory 151. In the operation, intermediate results are accumulated onto 64 memory words C[0]–C[63]. Thus, at the end of the accumulation process, the final multiplication result is represented by 64 memory words C[0]–C[63].

The above described multiplication process of A*B will be described. First, multiplication instruction MUL32 is defined. Multiplication instruction MUL32 instructs to find each partial product data (64 bits) on A*B, divides the partial product data into upper 32-bit data and lower 32-bit data, and store the divided data in field 21 of respective data packets for output.

Further, the above mentioned memory accumulation instruction ACCMC is defined here. In operating portion 141, after execution of multiplication instruction MUL32, memory accumulation instruction ACCMC is executed. The execution of memory accumulation instruction ACCMC allows a prescribed address in accumulation memory 151 to be calculated from generation number G of data packet PA1. Then, data D in field 21 of data packet PA1 is accumulated on the value read out from accumulation memory 151 designated by the prescribed address. Then, the accumulation result of data excluding any overflowing and underflowing value is written as a memory word in accumulation memory 151 in the region at the prescribed address. If overflow or underflow is caused, the value (+1 or −1) is stored instead of data D in field 21 of data packet PA1, which is then output.

Now, the above mentioned multiplication process of A*B will be described with reference to the above described multiplication instruction MUL32 and memory accumulation instruction ACCMC. FIG. 8 shows a multiplication expression of A*B of the present embodiment. As shown, the multiplication of multiple-precision data A (1024 bits) and multiple-precision data B (1024 bits) is shown in expression (1) of FIG. 8, corresponding to a sum of a plurality of multiplication results of 32-bit data hereinafter referred to as a partial product). In expression (1) of FIG. 8, <<(32*1) represents shift of 32 bits to the left, whereas <<(32*3) represents shift of (32×3) bits to the left.

Each partial product A[i]*B[j] in expression (1) of FIG. 8 has 64 bits in length. This is expressed by two data packets PA1 each having a field 21 of 32 bits. The partial product is found by execution of multiplication instruction MUL32 in MUL32 circuit 67 of operating portion 141. When multiplication instruction MUL32 is executed, partial product A[i]*B[j] is found, and the partial product is divided into upper 32-bit data and lower 32-bit data, whereby data packets respectively storing those divided data in fields 21 as data D are output.

Figure 9:
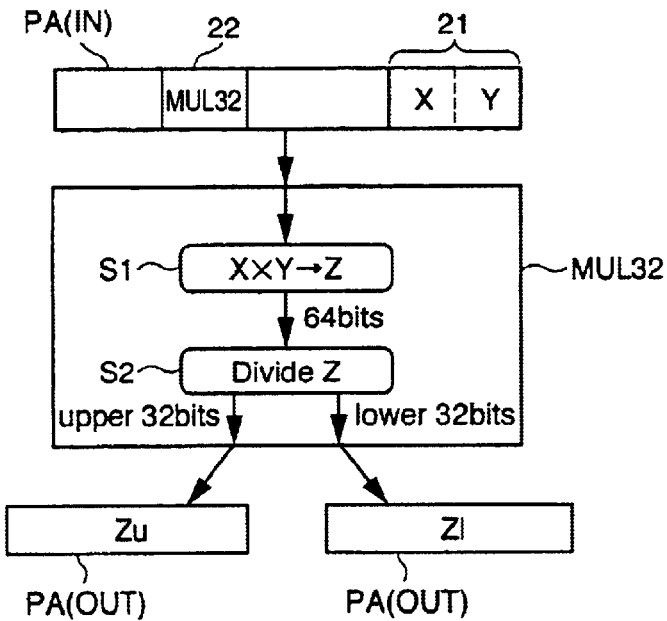
FIG. 9 is a flow chart showing a process using a multiplication instruction MUL 32 according to the present embodiment.

FIG. 9 is a flow chart showing a process with multiplication instruction MUL32 of the present embodiment. In FIG. 9, data packets PA1 respectively storing as data D 32-bit data X (A[i]) and 32-bit data Y (B[j]) are fired at firing controlling portion 13, and data packet PA (IN) storing as instruction code C "MUL32" and storing as data D data X (A[i]) and Y (B[j]) is applied to operating portion 141. Note that data packet PA (IN) shows only the contents of fields 21 and 22, and illustration of the other fields is omitted.

In MUL32 circuit 67 of operating portion 141, applied data packet PA (IN) is received and multiplication instruction MUL32 stored in field 22 of received data packet PA (IN) is executed (step S1). A value Z (A[i]*B[j]) of the multiplication result is divided into upper 32-bit data Zu (A[i]*B[j]_upper) and lower 32-bit data Zl (A[i]*B[j]_lower). The divided two data are respectively stored as data D in fields 21 of two data packets PA (OUT), which are then output from operating portion 141 (S2). Note that data packet PA (OUT) shows only the content of field 21, and the illustration of the other fields is omitted.

If data packet PA1 relates to partial product A[i]*B[j], subscripts i and j are stored in field 20 of generation number G as described above. More specifically, field 20 of generation number G has two regions, one storing "i" and the other storing "j," for enabling identification of partial product A[i]*B[j]. Then, an address of a memory word used for accumulating partial product A[i]*B[j] can be found from two regions of field 20 of generation number G. Namely, for data A[i]*B[j]_lower, address (i+j) of the memory word used for accumulation can be obtained by simply adding the values of these two regions. For data A[i]*B[j]_upper, address (i+j+1) of the memory word used for accumulation can be obtained by simply adding 1 to the value obtained by adding the values of these two regions.

Figure 10:
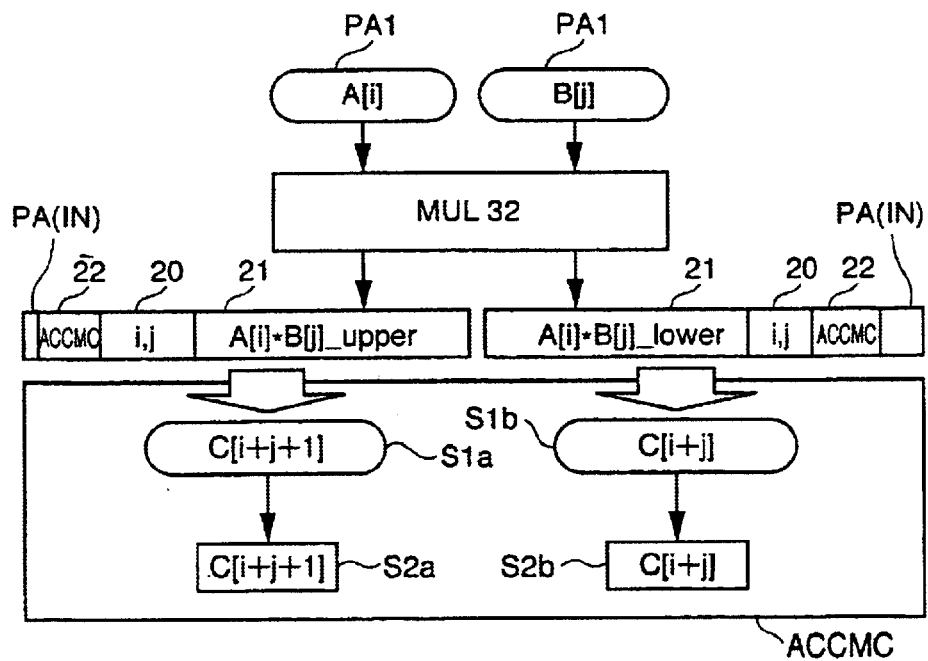
FIG. 10 is a flow chart showing a process content (multiplication and accumulation) for every partial product according to the present embodiment.

FIG. 10 is a flow chart showing a process content (multiplication and accumulation) for every partial product according to the present embodiment. Note that FIG. 10 assumes that no overflow is caused by accumulation. After multiplication instruction MUL32 of FIG. 9 is executed, data packet PA (OUT) of FIG. 9 circulates in the pipeline, whereby corresponding instruction code C is updated with accumulation instruction ACCMC in program storing portion 16 and again applied to operating portion 141.

Two data packets PA (IN) applied to ACCMC circuit 68 of operating portion 141 respectively store as data D data A[i]*B[j]_upper and data A[i]*B[j]_lower and store as instruction code C "ACCMC" and also i and j as generation number G. ACCMC circuit 68 of operating portion 141 receives two data packets PA (IN) and, in accordance with generation number G of received data packet PA (IN) storing data A[i]*B[j]_upper, reads out the content of memory word C[i+j+1] at address (i+j+1) of accumulation memory 151 (step S1a), accumulates data A[i]*B[j]_upper stored in received data packet PA (IN) on the read out value and writes the result as memory word C[i+j+1] at address (i+j+1) of accumulation memory 151 (step S2a).

In accordance with generation number G of received data packet PA (IN) storing data A[i]*B[j]_lower, memory word C[i+j] at address (i+j) in accumulation memory 151 is read out (step S1b). Data A[i]*B[j]_lower stored in received data packet PA (IN) is accumulated on the read out value, and the result is written as memory word C[i+j] at address (i+j) in accumulation memory 151 (S2b).

As shown in FIG. 10, by changing values represented by subscripts i and j of data A[i] and B[j] of which partial product is to be found, the address of the memory word designated in accumulation memory 151 is also changed, so that a shift operation is performed by every 32 bits. This corresponds to shifting by 32 bits in the process of calculating a sum of partial products in expression (1) of FIG. 8.

As described above, by accumulating partial products with use of accumulation memory 151, ultimate multiplication result C (2048 bits) is obtained.

Figure 11:
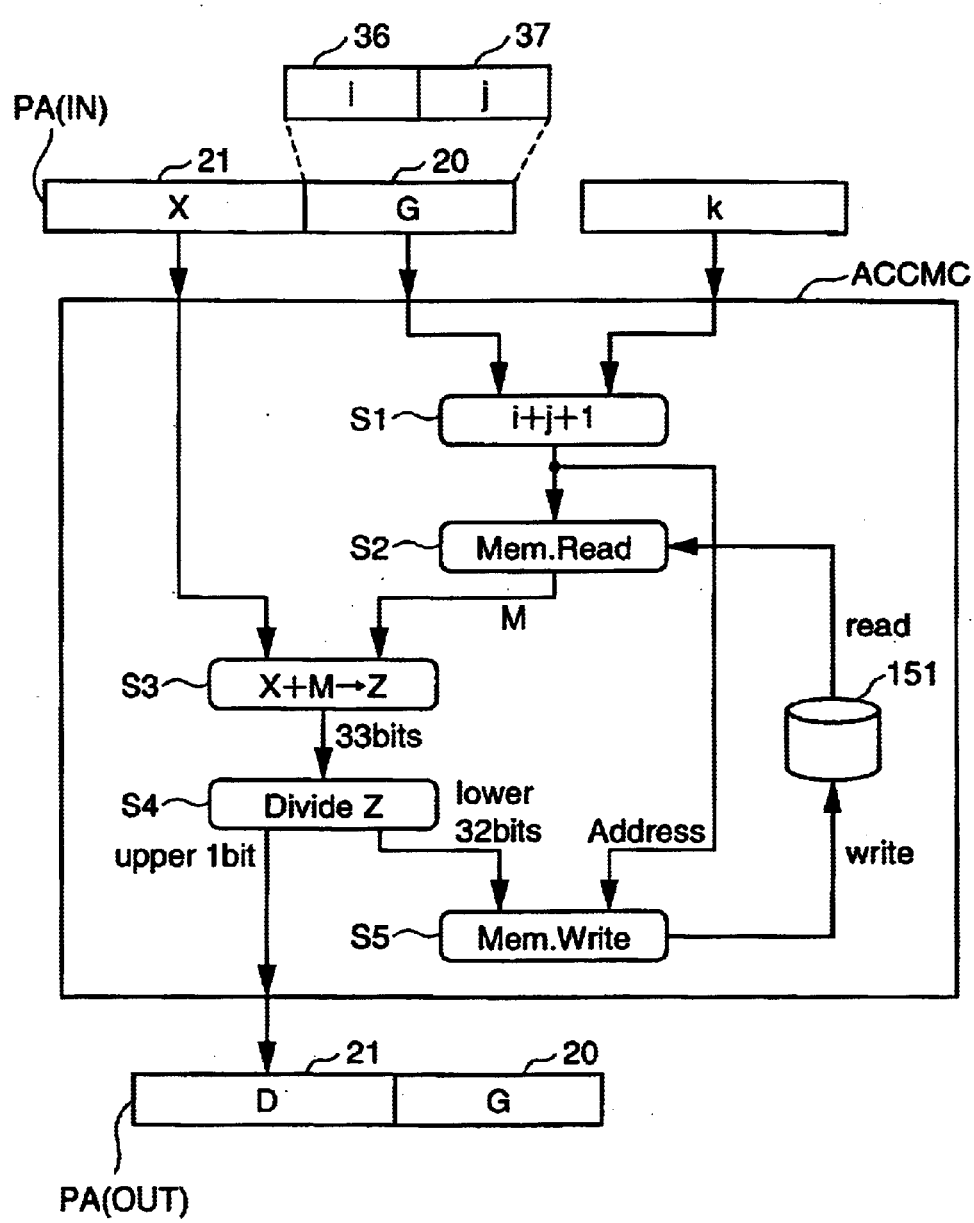
FIG. 11 is a flow chart shown in conjunction with a memory accumulation instruction ACCMC according to the present embodiment.

FIG. 11 is a flow chart shown in conjunction with memory accumulation instruction ACCMC of the present embodiment. Note that in FIG. 11, only fields 21 and 20 are shown for data packets PA (IN) and PA (OUT), and illustration of the other fields is omitted. In executing memory accumulation instruction ACCMC, first of all, data packet PA (IN) storing 32-bit data X (partial product A[i]*B[j]_lower or partial product A[i]*B[j]_upper) in field 21 and storing generation number G in field 20 is applied to operating portion 141. As stated previously, field 20 of generation number G of data packet PA (IN) has regions 36 and 37 respectively storing i and j for identifying partial products A[i]*B[j]. ACCMC circuit 68 of operating portion 141 receives applied data packet PA (IN) and, in accordance with memory accumulation instruction ACCMC of field 22 of received data packet PA (IN), calculates i+j+k using the content in field 20 (step S1). Note that k is a constant value (offset value) of 32 bits used for determining memory word C[0] in the region of accumulation memory 151.

Thereafter, data M stored as memory word C[i+j] at address i+j+k of accumulation memory 151 is read out (step S2), and addition is performed with read out data M (32 bits) as left input data and data X in field 21 of received data packet PA (IN) as right input data. As a result, an addition result Z of 33 bits is obtained (S3). Then, addition result Z is divided into lower 32-bit data and upper 1-bit data (step S4), the lower 32-bit data is written as memory word C[i+j] at address i+j+k in accumulation memory 151 (S5), the upper 1-bit data is stored in field 21 of received data packet PA (IN) in place of data X, received data packet PA (IN) is then output from operating portion 141 as data packet PA (OUT).

The upper 1-bit data of the addition result stored in data packet PA (OUT) as data D represents the occurrence of overflow as a result of the addition. If the value is "1," it means that overflow is caused. If "0," no overflow is caused. One of values i and j in field 20 of received data packet (IN) is incremented by 1, and i+j+k+1 is stored in field 20 of data packet PA (OUT). This is also applied in the case of underflow.

If data packet PA1 for overflow is output, here, in order to carry the effect of the overflow to accumulation memory 151, a data packet storing as data D the overflowing value is circulated in the pipeline and again applied to ACCMC circuit 68 of operating portion 141, and based on the content of the data packet, memory accumulation instruction ACCMC is executed in the similar manner. If the execution further causes overflow, memory accumulation instruction ACCMC is executed with respect to the address of accumulation memory 151. This address is higher by one than the previous address. This will be repeated until no overflow is caused.

When multiplication and accumulation respectively in accordance with multiplication instruction MUL32 and memory accumulation instruction ACCMC as described above are performed for all partial products in expression (1) of FIG. 8, the end of multiplication of multiple-precision data A and B can be determined from if an output of memory accumulation instruction ACCMC for all partial products is "0," i.e., if there is no overflow. This is determined based on the fact that data packet PA1 storing as data D output value "0" of memory accumulation instruction ACCMC corresponding to the total number (1024) of partial products in expression (1) of FIG. 8 is counted by 2048 (=1024×2).

Figure 12:
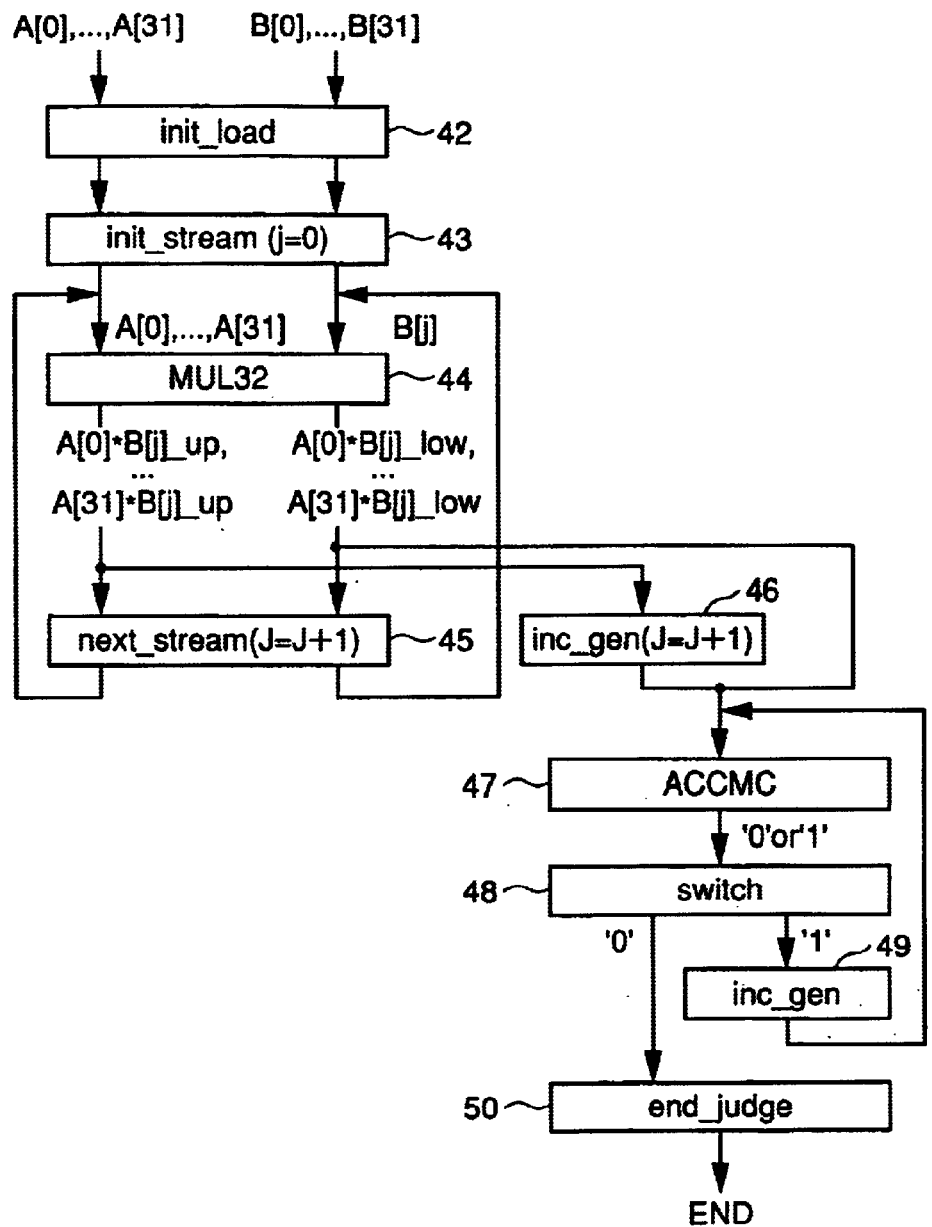
FIG. 12 is a flow chart showing an overall process related to multiplication of multiple-precision data according to the present embodiment.

FIG. 12 is a flow chart showing an overall process of multiplication of multiple-precision data of the present embodiment. FIG. 12 contains init_load module 42, init_stream module 43, module 44, next_stream module 45, inc_gen modules 46 and 49, ACCMC module 47, switch module 48 and end_judge module 50.

In init_load module 42, input data A[0]–A[31] and input data B[0]–B[31] are stored in accumulation memory 151. In the next init_stream module 43, 33 memory words A[0]–A[31] and B[j] of accumulation memory 151 are read out from accumulation memory 151 with value (j) of region 37 for the generation number being 0. The next module 44 corresponds to MUL32 circuit 67. In module 44, multiplication instruction MUL32 is executed as previously stated. MUL32 instruction is that shown in FIG. 9.

In the next_stream module 45, 1 is added to value (j) of region 37 in field 21 of input data packet PA1 and 33 memory words A[0]–A[31] and B[j] are read out from accumulation memory 151. The above described modules 44 and 45 perform respective processes over j=0–31 to provide all partial products. Upper 32-bit data and lower 32-bit data of the values of these partial products are stored in fields 21 of two data packets PA1, which are then output to inc_gen module 46.

The next inc_gen corresponds to inc_gen circuit 66. In module 46, 1 is added to value (j) of region 37 of data packet PA1 storing the upper 32-bit data. On the other hand, the value of region 37 of data packet PA1 storing the lower 32-bit data remains unchanged. This is performed to be consistent with the address of the memory word of accumulation memory 151, as stated previously.

The next module 47 for memory accumulation instruction ACCMC corresponds to ACCMC circuit 68. In module 47, the process shown in FIG. 11 is performed. Note that an address of memory word C[0] is stored as a constant k of FIG. 11.

The next switch module 48 corresponds to switch circuit 65. In module 48, data packet PA1 output from module 47 is sequentially input and data packet PA1 with or without the overflowing value is identified. Data packet PA1 storing the overflowing value is output to inc_gen module 49, and data packet PA1 not storing such a value is output to end_judge module 50. The branching of outputs is performed as follows. Namely, when the applied lower 1-bit data is 0 and 1, logic circuit LU of FIG. 2 respectively outputs 1 and 0 as flag FL. Thus, if flag FL is 1, the execution result of memory accumulation instruction ACCMC is 0. Then, for reading out the subsequent instruction code C from program memory 161 based on the value of flag FL output from switch module 48, one of instructions inc_gen and end_judge is selectively read out, so that the above described branching of outputs is implemented.

Inc_gen module 49 corresponds to inc_gen circuit 46. In module 49, the function similar to that of module 46 is performed. In end_judge module 50, the number of inputs of data packets PA1 having a value of 0 which does not represent overflow is counted. When the count reaches 2048, an end signal END for the operation process is output. The value of multiple-precision data C represented by memory words C[0]–C[63] in accumulation memory 151 at that time shows the ultimate multiplication result of multiple-precision data A*B.

Here, an effect produced by the above described embodiment will be described.

First, multiple-precision data A and B are divided into a plurality of single-precision data A[i] and B[j] and a group of fixed-length memory words in accumulation memory 151 is treated as multiple-precision data. Thus, a usual memory word can serve as an accumulator for multiple-precision data without using any special accumulator dedicated to multiple-precision data in data-driven processor 10.

As the multiple-precision data is divided into independent single-precision data, concurrent operation on data is enabled. Thus, a capability of parallel processing of data-driven processor 10 can be maximized. Since the data-driven processing method has, in addition to a parallel processing capability, a pipeline processing capability, in the multiplication process of multiple-precision data, if overflow successively occurs during accumulation of data with use of accumulation memory 151, the delay amount caused by the process of successively occurring overflow can be restrained by the other process of single-precision data. Namely, the occurrence of overflow hardly affects a required time (response) for the overall multiple-precision data operation.

In addition, there is no logical restriction as to the data length of multiple-precision data. Since a usual memory word or data packet PA (PA1) of driven processor 10 is used, data of any bit length can be processed as long as physical resources permit. Moreover, various types of multiple-precision data with different bit lengths can be processed concurrently.

Although the above described embodiment relates to multiplication of multiple-precision data, a similar process can be employed for any of addition, subtraction and division. In the cases of subtraction and division, subtraction from the content of accumulation memory 151 and an underflow output instruction may be employed instead of accumulation onto the content of accumulation memory 151 and overflow output instruction of FIG. 11.

In the data flow graph of FIG. 12, memory accumulation instruction ACCMC, switching instruction switch and instruction inc_gen are executed when adding once 32-bit data of accumulation memory 151 in the operation process of multiple-precision data using memory accumulation instruction ACCMC. Thus, if n overflows occur during the addition, an execution time corresponding to 3*n+1 instructions is required.

A method of implementing a set of instructions for aforementioned steps (A1)–(B5) without using memory accumulation instruction ACCMC can seem to be performed by one addition process using accumulation memory 151 within a time corresponding to one instruction. However, this method is not preferable for the following reasons. Specifically, when the operation in accordance with expression (1) of FIG. 8 is performed, a plurality of partial products of expression (1) are concurrently calculated by fully utilizing the pipeline process. If this method is applied, a number of data packets PA1 flow concurrently in the pipeline of FIG. 3. Thus, as stated previously, congestion of the pipeline and decrease in process speed are caused, whereby the pipeline process capability cannot be maximized in the data-driven processor.

On the other hand, when a similar process is to be performed with the use of memory accumulation instruction ACCMC, even if one addition to accumulation memory 151 involves an execution time corresponding to 3*n+1 instructions, the actual performance of the overall operation process of multiple-precision data is dramatically enhanced by the pipeline parallel process.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data-driven processor provided with a memory with n (where n is any integer of at least 2) regions each having a k-bit length (where k is any positive integer), comprising an operation processing portion for performing an operation on data stored in said n regions of said memory (hereinafter referred to as memory data), said operation processing portion including:

prescribed operation performing means for performing a prescribed operation on said memory data and said k-bit length data stored in a data field of an applied data packet in accordance with a prescribed operation instruction, dividing a result of said prescribed operation into a plurality of said k-bit length data, and outputting a plurality of said data packets storing said plurality of k-bit length data obtained by the division in said data fields;

data accumulating means for receiving said plurality of data packets output from said prescribed operation performing means, and for each of received plurality of data packets, accumulating said k-bit length data in said data field of the received data packet on the memory data in said region at a prescribed address of said memory, storing the accumulation result excluding overflowing data in that region, and outputting the received data packet storing said overflowing data in said data field; and overflowing data accumulating means for receiving said data packet storing said overflowing data in said data field, accumulating said overflowing data in said data field of the received data packet onto the memory data in the region at an upper prescribed address different from said prescribed address in said memory, storing the accumulation result excluding said overflowing data in the region, and outputting the received data packet storing said overflowing data in said data field, wherein the accumulation of said overflowing data by said overflowing data accumulating means is repeated as long as the accumulation causes said overflowing data in the region at said prescribed address.

2. The data-driven processor according to claim 1, wherein said operation processing portion further includes overflow determining means for determining if said overflowing data occurs in the region at said prescribed address by the accumulation, and the accumulation is performed on said overflowing data by said overflowing data accumulating means in response to a determination by said overflow determining means that said overflowing data occurs in the region.

3. The data-driven processor according to claim 1, wherein when two multiple-precision data each having a m (where m is any integer satisfying n*k≧m)-bit length are subjected to said prescribed operation, data obtained by dividing one of said multiple-precision data by every said k-bit length are stored in the n regions of said memory as said memory data, respectively, and data obtained by dividing the other of said multiple-precision data by every said k-bit length are stored in said data fields of said n data packets, respectively, which are sequentially applied to said prescribed operation performing means.

4. The data-driven processor according to claim 1, wherein said data packet further includes a generation field storing a generation number for uniquely identifying said data packet, and said prescribed address is designated based on a content of said generation field of said data packet.

5. The data-driven processor according to claim 1, wherein each of said data accumulating means and said overflowing data accumulating means is operated in accordance with an operation instruction for receiving applied said data packet, accumulating a content of said data field in the received data packet on the memory data in said region at said prescribed address of said memory, storing the accumulation result excluding overflowing data in said region, and storing said overflowing data in said data field of the received data packet for output.

6. A data processing method in a data-driven processor provided with a memory with n (where n is any integer of at least 2) regions each having a k-bit length (where k is any positive integer) and storing data in said n regions (hereinafter referred to as memory data), comprising:

a prescribed operation performing step for performing a prescribed operation on said memory data and the data having said k-bit length stored in a data field of an applied data packet in accordance with a prescribed operation instruction, dividing the result of said prescribed operation into a plurality of said k-bit length data, and outputting a plurality of said data packets storing said plurality of k-bit length data obtained by said division in said data fields, respectively;

a data accumulating step for accumulating said k-bit length data in said data field of said data packet on memory data in said region at a prescribed address of said memory, receiving said plurality of data packets output from said prescribed operation performing step, and for each of received plurality of data packets, storing the accumulation result excluding overflowing data in the region, and outputting said data packet storing said overflowing data in said data field; and an overflowing data accumulating step for receiving said data packet storing said overflowing data in said data field, accumulating said overflowing data in said data field of the received data packet on the memory data in said region at an upper prescribed address different from said prescribed address in said memory, storing the accumulation result excluding said overflowing data, and outputting the received data packet storing said overflowing data in said data field, wherein the accumulation of said overflowing data by said overflowing data accumulating step is repeated as long as the accumulation causes said overflowing data in the region at said prescribed address.

* * * * *